E. Hidden.
Ship's Lights.
N° 9,811. Patented Jun. 21, 1853.

Sheet 1, 2 Sheets.

E. Hidden.
Ship's Lights.
N° 9,811. Patented Jun. 21, 1853.
Sheet 2, 2 Sheets.
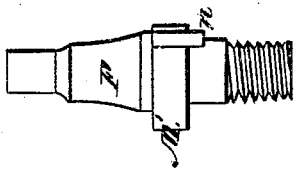
Fig. 1.
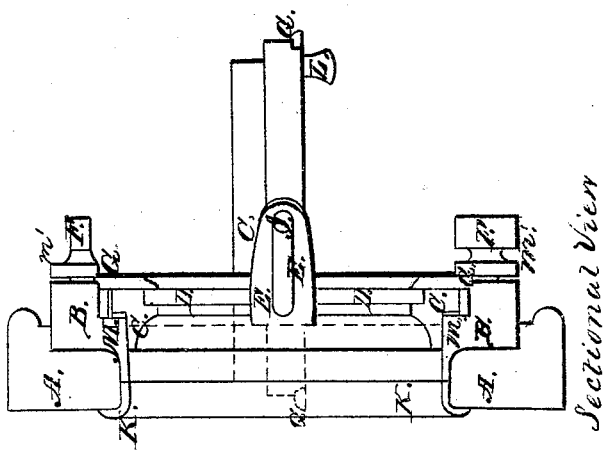
Fig. 3. Sectional View
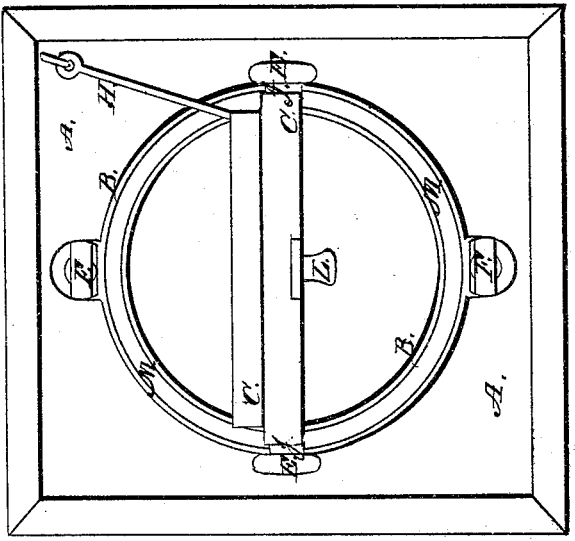
Fig. 2.

UNITED STATES PATENT OFFICE.

ENOCH HIDDEN, OF NEW YORK, N. Y.

SIDE LIGHT FOR SHIPS.

Specification forming part of Letters Patent No. 9,811, dated June 21, 1853; Reissued September 8, 1863, No. 1,533.

*To all whom it may concern:*

Be it known that I, ENOCH HIDDEN, of the city, county, and State of New York, have invented a new and useful Improvement in Ship-Lights for the More Convenient Ventilation and Use of the Same; and I do hereby declare that the following is a full, clear, and exact description of the construction and operation of the same, reference being had to the annexed drawings, making part of this specification, and the accompanying model representing the same.

In the different figures the same letters refer to the same parts.

Figure 5:
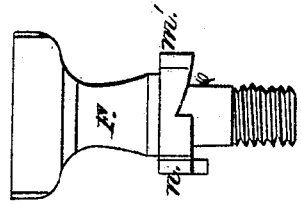
Figure 6:
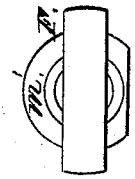
Figure 3:
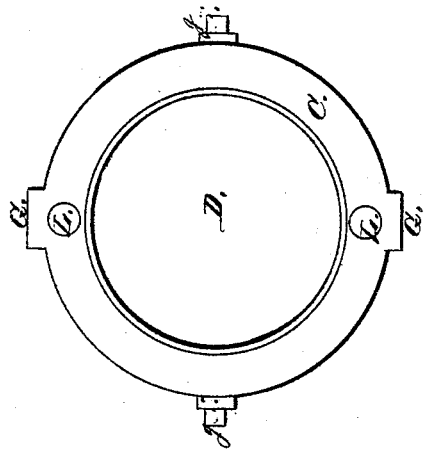
Figure 1:
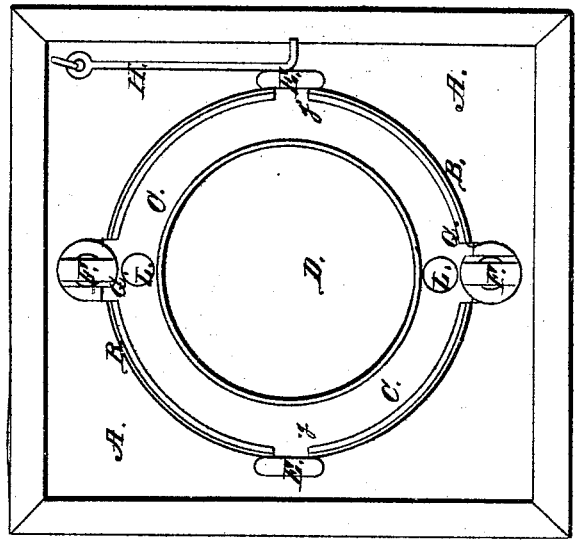

Figure 1, is a front view of my shiplight, in which the glass frame, or glass cell turns on pivots in the slots or chase mortises in the pieces projecting from the face of the main frame, when the light is air and water tight, Fig. 2, is also a front view showing the light frame, or glass cell at right angles to the ship's side, exhibiting the opening for ventilation, Fig. 3, is a side view of the light, in the same position as at Fig. 2, and also a section through the light when shut, Fig. 4, is a front view of the glass frame, or cell by itself with the glass in; also showing the pivots on which the glass frame turns, likewise the two projections by which the screws with the combined circular inclined planes secures the light in its place, Figs. 5, 6, and 7, show distinctly the construction of the screw, combined with the circular inclined plane, which screws the light frame, or cell, air and water tight to its place.

A, A, represents a portion of a ship's side, B, B the main frame of the light, securely fastened to it by screws, or otherwise, and rendered tight by the lead ring or other suitable material, K, K, turned over on the outside of the ship, and securely retaining the proper material, for making the joints air and water tight, with the ship's side.

C, C, is the movable frame or cell in which the glass is fastened, and turning on its pivots I, I, in the chase mortises in the projecting pieces, E, E, cast on the frame B.

F, F, are the screws with the combined inclined planes which firmly secures the light frame, or glass cell, to its india rubber seat M, M, embedded in the main frame of the light, making it air and water tight; the inclined circular planes, or those parts of the screws, acting on the projecting parts of the glass frame; or cell G, G, combined with the regular screwed parts on the points of the screws, completes the securing of the glass cell or frame in its place.

H, H, is a hook used for retaining the light in the desired position.

D, D, is the glass. L, L, the handles, or knobs, by which the light frame is moved, in the chase mortises, and turning it on its pivots. Figs. 5, 6 and 7 shows enlarged views, explaining the construction of the screws, combined with the circular inclined planes, showing their double action; O, O, being the circular inclined plane.

N, N, is a projecting pin for stopping the screw in its proper position, when the light is to be opened for ventilation.

The operation of the screws F is as follows: The screw F works in the main frame B as seen in Fig. 3, its flange M′ resting upon the projection G of the glass frame and tightening said frame by the working of the spiral O against the upper surface of the projection G; the turning of the screw pressing the inclined planes or spirals close to said surfaces, causing the glass frame to be drawn against the india rubber seat M.

I do not claim ship lights, turning on pivots, or center pins in frames, nor do I claim ship lights in frames turning on hinges, but What I do claim, and desire to secure by Letters Patent, is—

1. The arrangement of screws F tapped into the main frame B, in combination with inclined planes, or spirals O forming part of said screws that holds the light frame, or cell containing the glass, fast to the india rubber in its grooved seat, in the main frame, with its stop pin N for stopping the screw in its proper position, when the light is to be opened for ventilation.

2. I also claim the projecting ears E with slots or chase mortises, in which the pivots of the light frame or cell turns, allowing the light to be hauled from its seat and consequently out of contact with the india rubber, so as to allow the plane of the light, to be placed at any angle to the main frame, thus freely admitting of ventilation.

3. And further I claim the arrangement of a lead or other ductile metallic ring, soldered on, or otherwise joined to the main brass frame of the light, so that it can be turned around the outer edge of the opening in the vessel, securing any suitable material, completely, making the main frame of the light, water tight to the vessel: the whole substantially as herein set forth, in this specification and drawings, forming part of the same.

ENOCH HIDDEN.

Witnesses:
GEO. PATTEN,
JNO. OBER.